United States Patent Office 2,739,990
Patented Mar. 27, 1956

2,739,990
ADDITION OF HYDROGEN CHLORIDE TO TERTIARY MONO-OLEFINES

Harold Randolph Chipman, Elmira, Ontario, Canada, assignor to United States Rubber Company, New York, N. Y., a corporation of New Jersey No Drawing. Application January 21, 1953,
Serial No. 332,497

6 Claims. (Cl. 260—663)

The present invention relates to an improved method of effecting addition of hydrogen chloride, particularly when in gaseous form, to tertiary aliphatic monoolefins and more particularly to the preparation of 2-chloro 2,4,4-trimethylpentane from diisobutylene (either 2,4,4-trimethylpentene-1 or 2,4,4-trimethylpentene-2, or more commonly the mixture of these two $C_8$ aliphatic tertiary olefins such as is commonly available under the name "diisobutylene"). Still more particularly it relates to a method of making 2-chloro 2,4,4-trimethylpentane as an essentially pure compound in nearly quantitative yield by the addition of hydrogen chloride in gaseous form to liquid diisobutylene.

There are a great number of prior art disclosures on the addition of hydrogen chloride to olefins, particularly the lower olefins such as ethylene, acetylene, propylene and butylene under various conditions of temperature and pressure. In most instances metallic halides such as aluminum, iron, zinc and stannic chlorides or derivatives of boron trifluoride such as the hydrate or the addition compound formed by boron trifluoride with phosphoric acid, have been used as the catalyst for the addition. However, the previously known methods for the addition of hydrogen halides to olefins have not been suitable when applied to the tertiary olefins, such as diisobutylene, primarily because the previously employed catalysts cause polymerization when they are added to the tertiary olefins, as is noted by excessive heat developed upon the addition of such catalysts to such olefins. Attempts were made to eliminate such polymerization in the case of aluminum chloride by first forming a complex between the aluminum chloride and an ether, and using this complex as a catalyst. However, such expedients introduced objectionable complication and expense, and were not particularly satisfactory.

My invention is based upon the discovery that the addition of hydrogen chloride to a tertiary olefin can be effected in a simple and highly effective manner with almost quantitative yield of the corresponding tertiary alkyl chloride by contacting the hydrogen chloride with the tertiary olefin in the presence of an alkyl aryl sulfonic acid as a catalyst. I particularly prefer to employ a keryl aryl sulfonic acid as the catalyst and still more preferably I employ keryl benzene sulfonic acid.

The use of alkyl aryl sulfonic acids as catalysts for the hydrochlorination of tertiary olefins to give the corresponding tertiary alkyl chlorides has a number of advantages. A most important advantage is that the tertiary alkyl chlorides are formed in essentially pure condition and in almost quantitative yields. Another advantage is that the hydrochlorination proceeds rapidly at ordinary temperatures such as 25–40° C. Still another advantage is that gaseous hydrogen chloride can be utilized from any source such as by-product hydrogen chloride obtained from the chlorination of hydrocarbons or phenolic compounds such as ordinary phenol, etc. A further advantage is that the use of diluents such as acetic acid, chlorinated aliphatic hydrocarbons, normal aliphatic hydrocarbons, etc., is rendered unnecessary. An additional advantage is that when it is desired to make 2-chloro 2,4,4-trimethylpentane, the ordinary commercial diisobutylene can be used as is in the reaction. A very great advantage is that the catalysts used in my invention do not cause any substantial polymerization of the tertiary olefins. Yet another advantage is that the necessity for forming a complex is completely eliminated.

My invention is based upon the unexpected discovery that when an alkyl aryl sulfonic acid such as keryl benzene sulfonic acid is added to a tertiary olefin, there is no evolution of heat, or any other indication of polymerization, and yet when the hydrogen chloride is introduced into the mixture, heat is developed, indicating a chemical reaction, as a result of which the tertiary olefin is smoothly converted to practically a 100% yield of the tertiary alkyl chloride.

In practicing my invention, I prefer to employ the tertiary olefin in liquid form. This is most easily achieved by using a tertiary olefin which is liquid at atmospheric pressure at the temperatures of 25–40° C. most commonly employed for the practice of my invention. With this liquid tertiary olefin I admix a suitable amount of an alkyl aryl sulfonic acid. The alkyl aryl sulfonic acid used as catalyst has the further advantage that it is completely miscible in catalytic proportions with the tertiary olefin so that it is not necessary to supply any special form of agitation in order to maintain a homogeneous single phase reaction mixture. The gaseous hydrogen chloride is simply bubbled into this liquid mixture, preferably using some means such as an ordinary gas disperser to obtain intimate contact between the gas and the liquid and to obtain complete utilization of the hydrogen chloride content of the incoming gas.

The reaction can be controlled, if desired, by the application of slight cooling to the reactor. If desired, a stream of water can be caused to flow down the sides of a tall vertical reactor. No special cooling problem is presented because the reaction does not develop excessive heat and can be easily controlled within the desired limits in plant operation.

Upon the completion of the reaction, the alkyl aryl sulfonic acid must be neutralized prior to recovery of the tertiary alkyl chloride as a product because the alkyl aryl sulfonic acid otherwise would tend to catalyze the breakdown of the tertiary alkyl chloride. This neutralization can easily and effectively be achieved by addition of a base. Preferably, the neutralization is performed by the addition of an organic amine. It is thus possible to form an inactive salt of the catalyst that is soluble in the tertiary alkyl chloride so that no further filtration step is necessary. The neutralized mixture can then be distilled in any suitable way, preferably at reduced pressure to minimize decomposition, and the tertiary alkyl chloride can be recovered as an overhead fraction in high purity and at high yield. The tertiary alkyl chloride product thus obtained is a colorless compound. If the neutralized mixture is to be stored prior to such distillation, the storage vessels preferably are lined with glass or rubber to prevent contamination.

It will be seen that the present invention provides a simple method for the utilization of waste or by-product hydrogen chloride gas from industrial chlorinations where hydrogen chloride is split off, to produce tertiary alkyl chlorides without the necessity of expensive equipment. Ordinary non-corroding equipment such as glass-lined vessels can be used for carrying out my process. The tertiary alkyl chloride product can be prepared in a pure state without the necessity of distilling off any inert solvent or removing polymerized material, there being virtually no polymerization of the olefin in the practice of my invention. The process of my invention is particularly valuable with liquid tertiary aliphatic olefins since there is no necessity for vaporizing them in order to obtain intimate contact with the hydrogen chloride gas.

The tertiary alkyl chloride formed in the process of my invention is completely miscible with the other components of the reaction mixture so that no separation thereof occurs during the process.

The alkyl side chain in the alkyl-substituted aryl sulfonic acid can vary widely in length but preferably contains at least 10 carbon atoms. I prefer to employ those alkyl-substituted aryl sulfonic acids wherein the alkyl side chain is derived from relatively long, straight chain or branched chain paraffin hydrocarbons, especially kerosene, and wherein the aryl group is derived from aromatic hydrocarbons, typified by benzene, toluene, xylene and naphthalene. Such sulfonic acids are typified by keryl benzene sulfonic acid, keryl toluene sulfonic acid, keryl xylene sulfonic acid and keryl naphthalene sulfonic acid. As is well-known in the art, the term "keryl" denotes a mixture of alkyl side chains of length ranging from $C_{12}$ to $C_{16}$ and derived from commercial Tetrapropylene or a highly saturated kerosene of paraffinic nature. Keryl benzene is made by chlorinating such a kerosene to produce predominantly the monochlorinated product which is then condensed with benzene in a typical Friedel-Crafts reaction using aluminum chloride as the catalyst. The average molecular weight of keryl benzene is from 260 to 270.

The alkyl aryl sulfonic acid employed as catalyst in the practice of my invention is highly effective, and need be present only in very small amount to expeditiously catalyze the hydrochlorination of the tertiary olefin. Generally speaking, the amount will range from 1 to 10% by weight based on the weight of the olefin. I have obtained very good results using 2% by weight of catalyst.

Any tertiary aliphatic olefin can be used in the practice of my invention. The lowest member of the tertiary olefin series is isobutylene, but this is not as well suited to the practice of my invention as are the higher normally liquid tertiary olefins. Isobutylene requires the exertion of pressure in order to hold it in liquid form at atmospheric temperature or at the moderate temperatures (25–40° C.) preferably used in the practice of my invention. Generally speaking, however, I can use any tertiary olefin containing four or more carbon atoms. In addition to isobutylene, I can use the tertiary pentenes, namely, 2-methylbutene-1 and 2-methylbutene-2 which are converted to tertiary pentyl chloride by my process. Also, any of the tertiary hexylenes, any of the tertiary heptylenes, or any of the tertiary octylenes, are suitable. Even higher tertiary olefins can be used, such as the tertiary nonylenes, decylenes, dodecylenes, etc. Generally, the tertiary olefin employed will contain from 5 to 12 carbon atoms per molecule.

The most preferred tertiary olefin is diisobutylene. The term "diisobutylene" denotes either 2,4,4-trimethylpentene-1 or 2,4,4-trimethylpentene-2 or mixtures of these two isomeric olefins. Commercial diisobutylene, as prepared by the dimerization of isobutylene, consists of a mixture of 80% of 2,4,4-trimethylpentene-1 and 20% of 2,4,4-trimethylpentene-2 and can be used in place of the pure individual octylenes. The addition of the hydrogen chloride to each of these two isomers gives for the most part the same chloro compound, as is indicated by the following equations, wherein KBSA indicates keryl benzene sulfonic acid:

The course of the reaction can be followed by observing the increase in weight of the reaction mixture. When the increase in weight indicates that the theoretical amount of hydrogen chloride, i. e., the amount thereof which is theoretically molecularly equal to the amount of tertiary olefin employed, the reaction is complete. Since the addition of the hydrogen chloride to the tertiary olefin in the presence of the alkyl aryl sulfonic acid is accompanied by the evolution of a small amount of heat, if the temperature of the reaction mixture is controlled properly by external cooling, it is also possible to determine the end point of the reaction by observing the point at which no further rise in temperature occurs. It is more convenient in many cases however to follow the course of the reaction by a specific gravity measurement. For example, diisobutylene has a specific gravity of 0.71–0.72 at 20° C. and the pure 2-chloro 2,4,4-trimethylpentane has a specific gravity of 0.876 at 25° C. and 0.869 at 32° C. Hence, when the specific gravity of the reaction mixture approaches this point, the hydrochlorination can be considered essentially complete. As indicated above, the pure tertiary alkyl chloride contained in the reaction mixture cannot be isolated by distillation of the crude reaction mixture, because it is unstable at boiling temperatures, even at reduced pressure, in the presence of the alkyl aryl sulfonic catalyst. Hence, the catalyst is preferably first neutralized with an organic amine, such as triethylamine, after which the tertiary alkyl chloride is distilled over. I prefer to use reduced pressures in this distillation to minimize any possible decomposition. I often employ pressures of the order of about 13 millimeters, collecting in the case of diisobutylene, the fraction which boils at about 40° C., and which constitutes 90–95% of the total reaction mixture.

The following example illustrates my invention in more detail.

*Example*

Commercial diisobutylene (474.4 grams, 4.2 moles) was added to a one litre three-necked flask, provided with a hydrogen chloride inlet, a thermometer and an agitator. Keryl benzene sulfonic acid (9.5 grams) was added to the diisobutylene with good agitation, and complete solution thereof resulted, giving a black-colored liquid. No evolution of heat was noted at this point, indicating that no polymerization of diisobutylene took place.

Hydrogen chloride gas obtained from the chlorination of phenol was then bubbled into the diisobutylene at the rate of 2.7 grams per minute. A rise in temperature was observed, and the reaction mixture was maintained at 28–38° C. A gain in weight of 75 grams per hour or 1.25 grams per minute was noted. After two hours, 153.3 grams (4.2 moles) of hydrogen chloride had been added. The specific gravity of the mixture was then 0.863 at 32° C. Some of the reaction mixture (11 grams) was lost, due to volatilization of diisobutylene by unabsorbed hydrogen chloride.

The reaction mixture was neutralized with 2 grams of triethylamine. The specific gravity of the neutralized mixture was 0.876 at 15° C. The neutralized reaction mixture was then placed in a distillation flask and distilled therein under reduced pressure. The fraction boiling at 40° C. at 13 millimeters pressure was collected. This fraction was almost pure 2-chloro 2,4,4-trimethylpentane and weighed 585 grams corresponding to a 93% yield of the purified product.

As used herein the term "tertiary olefin" denotes those aliphatic olefins which are characterized by the grouping $R_2C=C<$ where R is an alkyl group and where the unsatisfied bonds are connected either to hydrogen or to alkyl groups. As used herein, the term "tertiary alkyl chloride" denotes an alkyl chloride in which the chlorine is connected to a carbon atom which in turn is connected to three alkyl groups.

The tertiary alkyl chlorides provide an excellent method

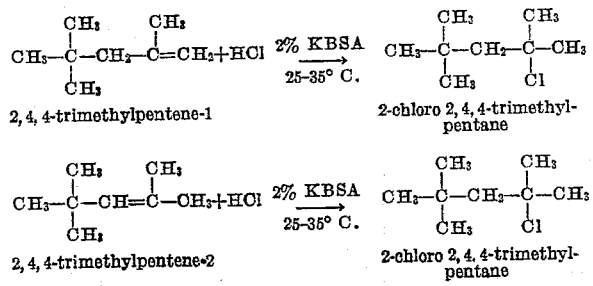

of storing and generating hydrogen chloride, as is described in detail in my copending application Serial No. 332,498, filed January 21, 1953, now Patent No. 2,673,788. For example, the tertiary alkyl chloride obtained from diisobutylene contains 24–25% of combined hydrogen chloride which can readily be liberated by simply admixing therewith a suitable amount of an alkyl aryl sulfonic acid and passing an inert gas into the mixture at a suitably elevated temperature, say 75–80° C., or distilling the mixture at a higher temperature, say 150° C. The regenerated tertiary olefin is collected in a cooled receiver, while the regenerated hydrogen chloride, which is anhydrous and highly pure, is allowed to pass through the system in gaseous form to any desired means for utilizing the hydrogen chloride. This makes available to the art a highly convenient means of recovering, storing or transporting, and utilizing at will hydrogen chloride obtained from gaseous by-product streams, such as those which are evolved from commercial chlorination processes. The recovered hydrogen chloride, in combined form as the tertiary alkyl chloride, can be regenerated at any desired time and place in a simple and convenient manner.

Having thus described my invention, what I claim and desire to protect by Letters Patent is:

1. The method of effecting addition of hydrogen chloride to a tertiary monoolefin containing 5 to 12 carbon atoms which comprises passing the said hydrogen chloride in gaseous form into a solution in the said olefin of from 1 to 10% of an alkyl aryl sulfonic acid as a catalyst, the said alkyl group in the aryl sulfonic acid containing from 10 to 16 carbon atoms.

2. The method as in claim 1, in which the said alkyl group is a keryl group.

3. The method as in claim 1, in which the said tertiary olefin is diisobutylene.

4. The method as in claim 3 in which the said alkyl group is a keryl group.

5. A method of making 2-chloro 2,4,4-trimethylpentane comprising passing gaseous hydrogen chloride into a solution in diisobutylene of from 1 to 10% of keryl benzene sulfonic acid as a catalyst until an amount of hydrogen chloride approximately molecularly equivalent to the amount of diisobutylene has been absorbed, and recovering the resulting 2-chloro 2,4,4-trimethylpentane from the said solution by neutralizing the catalyst content thereof with a base and then distilling the said 2-chloro 2,4,4-trimethylpentane overhead from the neutralized mixture under reduced pressure.

6. A method as in claim 5 in which the said base is an organic amine.

References Cited in the file of this patent

UNITED STATES PATENTS

| | | |
|---|---|---|
| 2,031,228 | Reilly | Feb. 18, 1936 |
| 2,573,695 | Dolnick et al. | Nov. 6, 1951 |